TIME DIVISION SIGNALING ARRANGEMENT

Filed July 15, 1963 4 Sheets-Sheet 1

INVENTORS
John S. Young
Robert M. Schildgen

BY

ATTY.

INVENTORS
John S. Young
Robert M. Schildgen
BY
C. A. Gullbrandsen
ATTY.

TIME DIVISION SIGNALING ARRANGEMENT

Filed July 15, 1963 4 Sheets-Sheet 3

INVENTORS
John S. Young
Robert M. Schildgen
BY
O. A. Gulbrandsen
ATTY.

July 25, 1967 R. M. SCHILDGEN ET AL 3,333,245

TIME DIVISION SIGNALING ARRANGEMENT

Filed July 15, 1963 4 Sheets-Sheet 4

INVENTORS
John S. Young
Robert M. Schildgen

BY C. A. Gulbrandsen

ATTY.

United States Patent Office 3,333,245
Patented July 25, 1967

3,333,245

TIME DIVISION SIGNALING ARRANGEMENT

Robert M. Schildgen, Northbrook, and John S. Young, Addison, Ill., assignors to Automatic Electric Laboratories, Inc., Northlake, Ill., a corporation of Delaware Filed July 15, 1963, Ser. No. 295,098
10 Claims. (Cl. 340—147)

ABSTRACT OF THE DISCLOSURE

Apparatus for operating relays on a time division multiplex basis. A time division power supply and selecting switches are employed to selectively operate a plurality of relays by way of a time divided highway. Equipment is provided to monitor the power supply and transfer to standby equipment in the event of faults such as overlapping time positions, loss of switched potentials during time positions and permanent rather than switched output potentials.

This invention relates to signalling arrangements and in particular to signaling arrangements employing the time division principles for providing a plurality of signals to be transmitted over a single conductor.

Telephone systems have been designed which provide private branch exchanges for a customer, such as a hotel or a bank, having a number of individual telephone subsets. In general, each of these private branch exchanges require an attendant to complete connections for incoming calls and to provide "outside lines" for outgoing calls. Such installations may require many attendants where there is a large amount of telephone traffic. The article, "Centrex Service: A New Design for Customer Group Telephone Service in the Modern Business Community," published in the November 1961 issue of Communication and Electronics, describes a concept for telephone communications systems wherein the subscribers of several such customers as noted above would share the same group of equipment and each customer within the group would share the same attendants' services. Some of the special services which may be offered to subscribers in this type of system are conference calls, camp-on-busy, busy override and the holding of calls. Several groups would also share the same equipment facility. In such systems it is necessary to extend many signals in two directions, say between an incoming trunk circuit and the attendant position equipment. In the prior art PABX systems it would have been required to extend several physical signaling paths to accommodate these various signals. However, the present invention may be practiced in conjunction with conventional switching equipment just as if such equipment actually included a plurality of distinct physical signal paths for extending the signals that are associated with the various special features or services. It should be noted furthermore, that the invention is also applicable to an environment other than that of a PABX system.

It is therefore the object of the invention to provide a new and improved signaling arrangement.

As previously described, telephone service of the type described may require the signals to be extended in two directions between two locations. Duplex signaling circuits are well known in the art in which signals, such as dial pulses of one predetermined character may be extended between offices. It is a more particular object of the invention to provide a new and improved duplex signaling arrangement which permits the transmission of a plurality of different signals on a single conductor at a high speed.

In the embodiment disclosed hereinbelow the invention has been applied to signaling over what is commonly known as the "EC lead" or fourth wire in step-by-step switching equipment. The invention makes it possible to use this extra lead as a common signaling path for controlling, in duplex fashion, a plurality of relays in the switching equipment. Controlling a plurality of relays in a duplex manner over a single electrical connection may be advantageously accomplished by the use of time sharing. It is therefore a further object of the invention to provide a new and improved duplex signaling arrangement employing a single conductor as a multiple channel signal path for operating a plurality of electro-mechanical relays on a time sharing basis.

It is a further object of the invention to provide a time division power supply for generating signals in recurring discrete time divisions.

It is known to use time divisions or discrete "time slots" to transmit a plurality of telephone conversations over a common transmission highway. In one time division multiplex system, the calling party and the called party are assigned the same time slot by the system equipment. One such communication system is disclosed in U.S. Patent 3,015,659, issued to A. H. Faulkner and D. K. Melvin, and assigned to the same assignee as the present invention. In other time sharing systems each subscriber is permanently assigned a particular time slot. For example, if a subscriber assigned to the time slot number 1 wishes to converse with a subscriber assigned to time slot number 7 the system equipment will transfer the information in time slot number 1 to time slot number 7 for the benefit of the subscriber permanently assigned to time slot number 7, and will similarly transfer information transmitted in time slot 7 to time slot 1 for the benefit of the subscriber permanently assigned to time slot number 1. A system of the type just mentioned is described by L. K. Lugten in his U.S. patent application Ser. No. 132,186, filed Aug. 17, 1961, now U.S. Patent 3,258,536, and assigned to the same assignee as the present invention. The present invention distinguishes from arrangements of the foregoing kind in that it facilitates the use of time division multiplex techniques for the control of relays.

In the preferred embodiment of the invention a capacitance is connected in shunt relation across the winding of a signal-detecting relay; this capacitance charges in repetitive time cycles or frames during its associated time slot, and then discharges through the winding of the relay during the remainder of the time cycle. The charging and discharging action of the capacitance provides an effective voltage that is sufficient to operate the relay. Diode means are serially connected with each relay for isolating each relay-capacitance combination from other such combinations, thus insuring a local discharge through the relay winding.

The invention, as to its operation, objects, and features not specifically recited above will best be understood by the following description taken in conjunction with the accompanying drawings.

Figure 5:
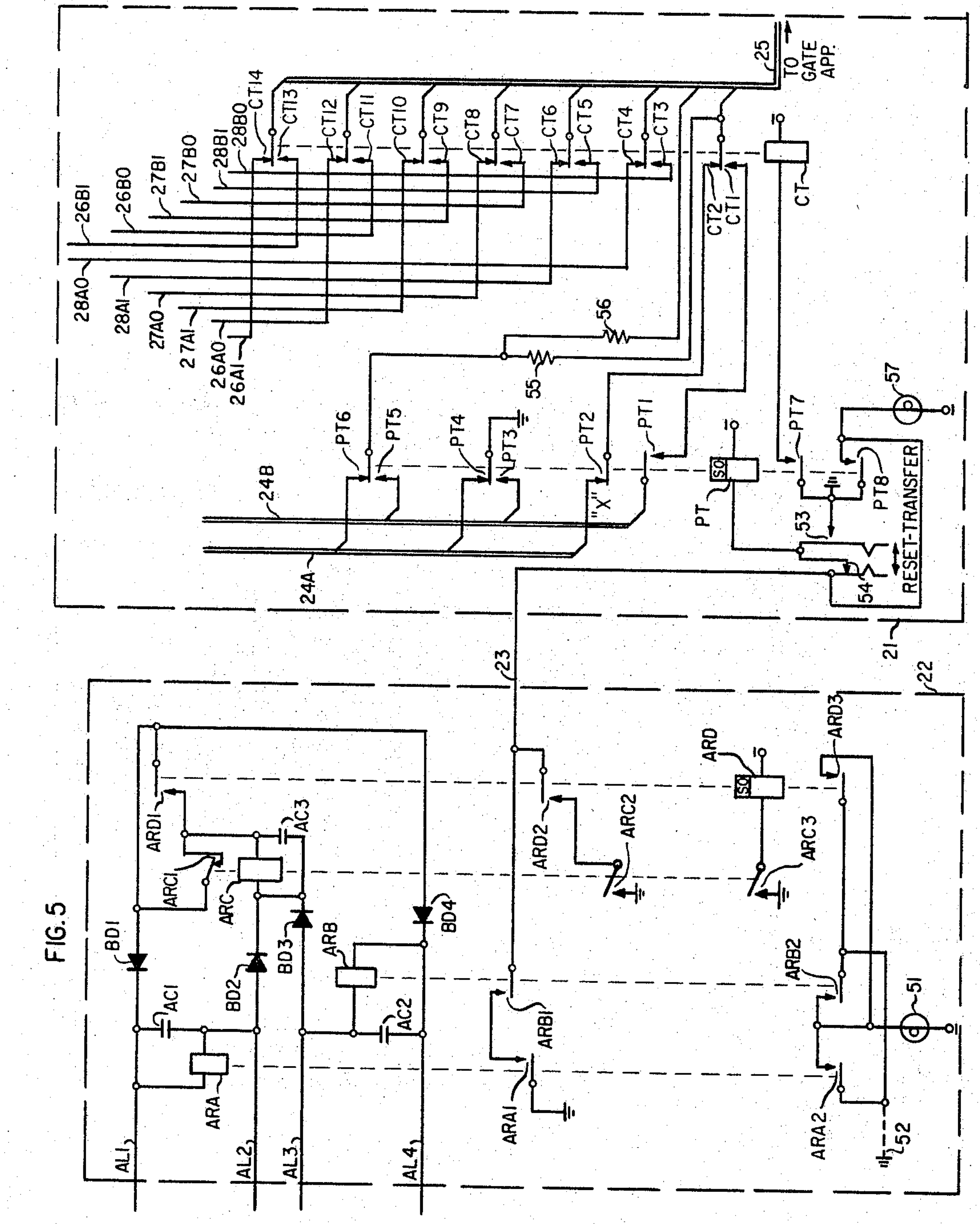
FIG. 5 is a circuit diagram showing the power supply monitoring and transfer equipment of FIG. 2 in greater detail.

With the exception of FIG. 5, no contacts have been shown for the relays in the accompanying drawings, since such contacts are not particularly necessary in describing the present invention.

Figure 1:
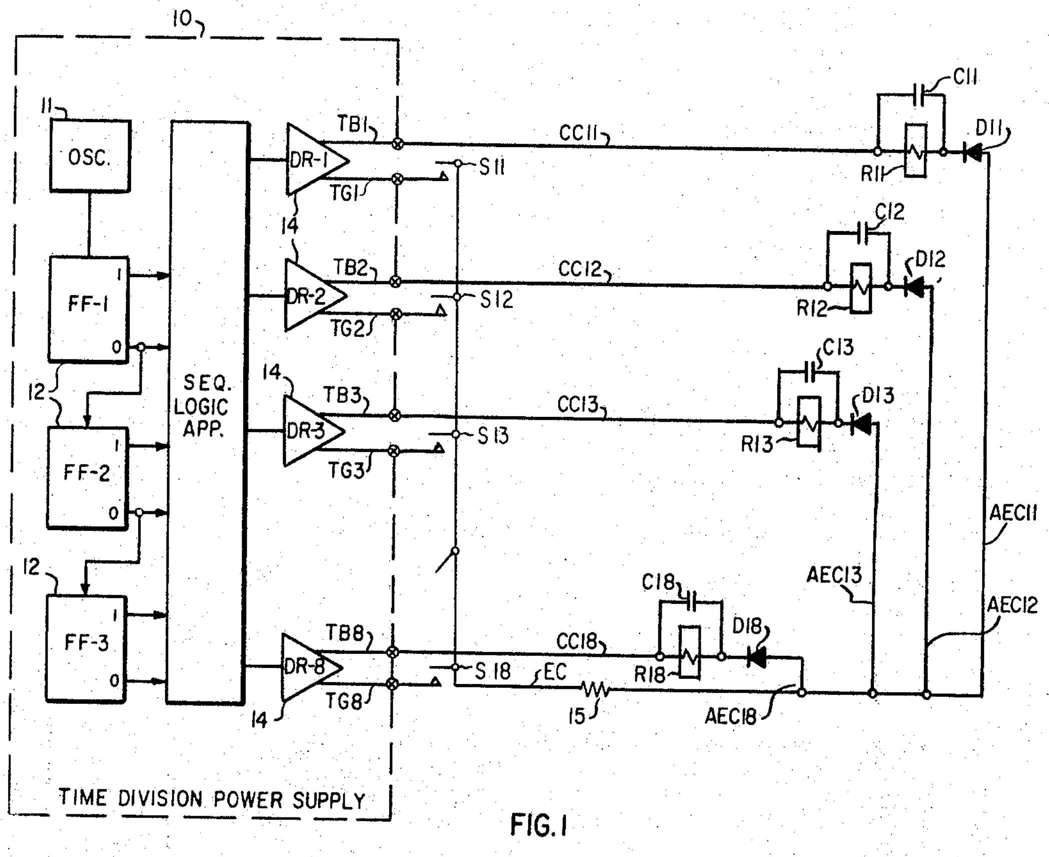
FIG. 1 is a simplified schematic representation of an embodiment of the invention employing the principles of time sharing.

Referring to FIG. 1, a plurality of relays R11 to R18 are shown which receive operating power from a time division power supply 10. Each of the relays is respectively shunted by a capacitance C11 to C18 and each relay-capacitance combination has a diode D11 to D18 respectively connected in series therewith. Relays R14 to R17, capacitors C14 to C17, diodes D14 to D17, switches S14 to S17 and connections EC14 to EC17 should be understood to exist although for sake of clarity they are not shown in the drawing. It should be noted that a similar action has been taken with respect to FIG. 3. The time division power supply 10 includes an oscillator 11, a series of bistable circuits 12, further designated FF–1 to FF–3 and a sequence logic arrangement 13 for providing the proper output sequence for the power supply. Also included in the power supply is a plurality of drivers 14, further referenced DR–1 to DR–8, having switched battery outputs (TB1 to TB8) and switched ground outputs (TG1 to TG8). The relays and the time division power supply are properly interconnected by connections CC11 to CC18 and the common electrical connection EC and its branches AEC11 to AEC18 via switches S11 to S18 respectively. The relays have been shown to include a resistance. This is the impedance of the operating winding and is much greater than the resistance 15, which is the distributed resistance of the charging path of the capacitors. This resistance relationship is most important and will be discussed during the operational description of the invention.

Figure 2:
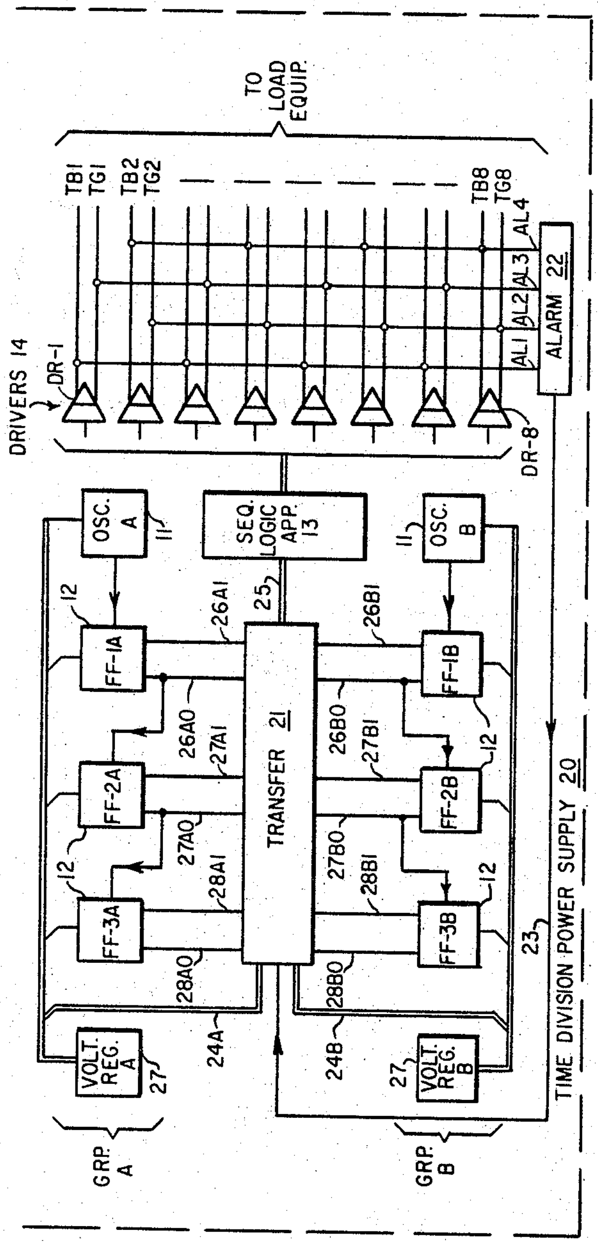
FIG. 2 is a schematic representation of an embodiment of the power supply employing the principles of time sharing and showing equipment for monitoring the operation of the power supply.

Referring to FIG. 2, a more detailed description of the time division power supply is given. In FIG. 2 however, dual circuitry is shown for the oscillator 11 and the bistable circuits 12. Also shown are two voltage regulating apparatus 27 (one for each group), transfer apparatus 21 and alarm apparatus 22. The sequence logic apparatus 13 and the drivers 14 are the same as that shown in FIG. 1. Briefly this time division power supply 20 operates in a manner such that oscillations of the oscillators 11 are counted by the bistable circuits 12, each of which is connected by way of the transfer apparatus 21 to the sequence logic apparatus 13 to encode the sequence of operation of the drivers 14. Any faults or failures in the operation of the power supply will be detected by the alarm apparatus 22 which in turn will enable the transfer apparatus by way of connection 23 and transfer the outputs to the sequence logic apparatus from the, say group A bistable circuts to the group B bistable circuits. Manual transfer is also available and will be seen during the operational description of the invention.

Figure 6:
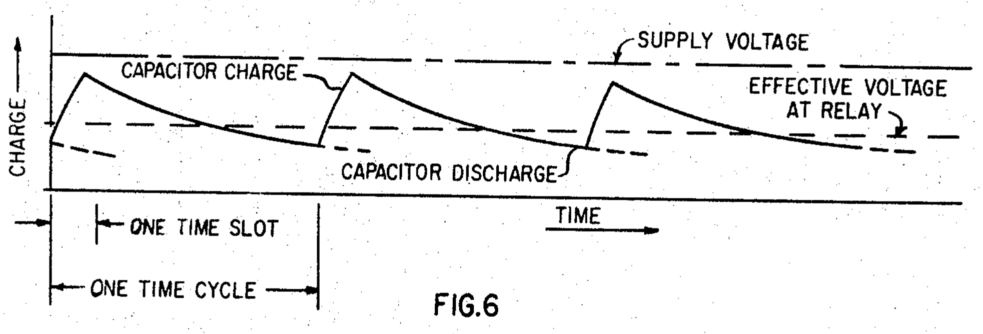
FIG. 6 is a graphical representation of capacitor charge and discharge as it relates to the present invention.
Figure 3:
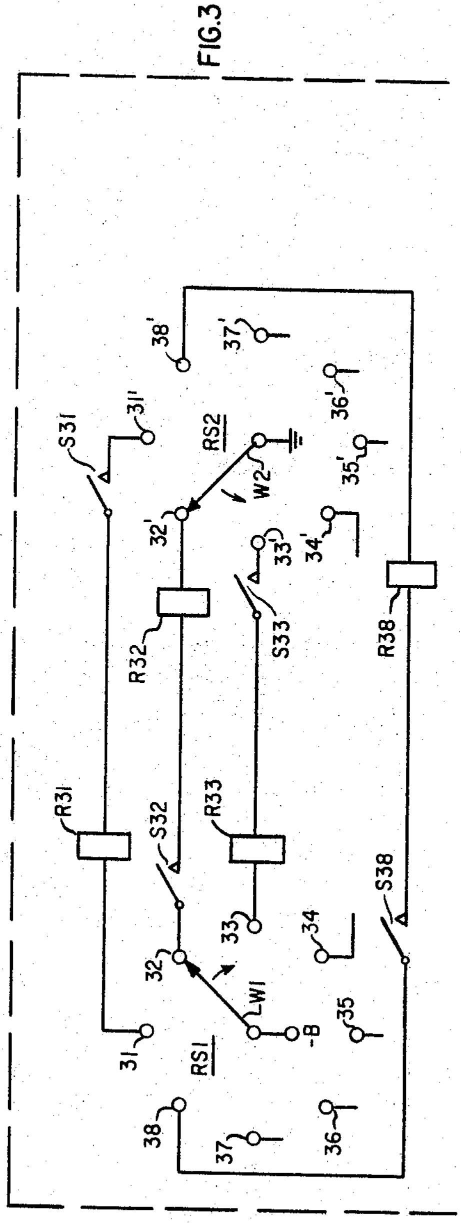
FIG. 3 is a schematic representation of a relay powering arrangement employing mechanical time division means and is offered as an aid in describing the present invention.

FIGS. 3 and 6 are relatively self explanatory and will be described during the operational description of the invention.

Figure 4:
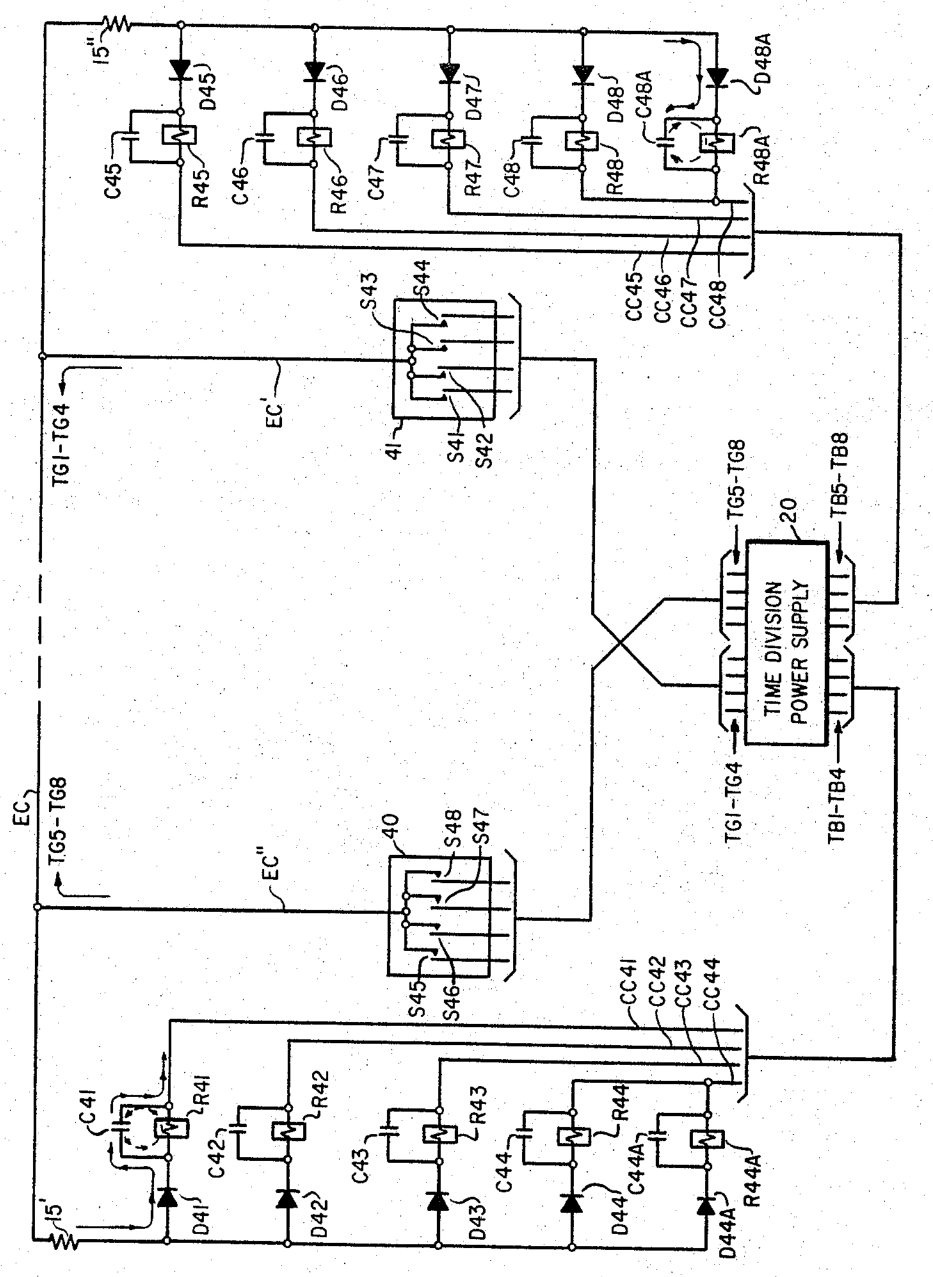
FIG. 4 is a schematic representation of an embodiment of the invention showing a duplex signaling arrangement employing the time division power supply of FIG. 2.

Referring to FIG. 4, an embodiment of the invention shows a duplex signalling arrangement employing the principles of time sharing. A time division power supply 20 is employed to furnish switched potentials in the form of TB1 to TB8 and TG1 to TG8 (battery and ground respectively) to signal relays R41 to R48. Capacitances C41 to C48 and diodes D41 to D48 are shown connected as were the capacitors and diodes of FIG. 1. Elements R44A, C44A, D44A, R48A, C48A, and D48A indicate that it is possible to operate more than one relay per time slot, however, to provide a simplified and clear drawing only one such combination of elements is shown for the remaining time slots. Similar electrical connections are provided between the relays and the power supply as was in FIG. 1. However, the switched rounds (TG1 to TG4) for relays R41 to R44 and the switched grounds (TG5 to TG8) for relays R45 to R48 are divided and transmitted to their respective relays through the switching apparatus 41, 40 and the electrical transmission highway EC in duplex fashion. Since in FIG. 4 there are now two capacitor charging paths, as opposed to one path in FIG. 1, the distributed resistance has been shown as 15′ and 15″.

FIG. 5 illustrates the alarm apparatus 22 and the transfer apparatus 21 of FIG. 2 in detail. The alarm apparatus includes the monitoring and alarm relays ARA, ARB, ARC, and ARD, the capacitances AC1, AC2, and AC3, the diodes BD1, BD2, BD3 and BD4, and the alarm lamp 51. The ground 52 is supplied via other alarm equipment, say an audible signal source. It should be noted that the above relays and associated equipment, with the exception of relay ARD, have substantially the same circuit configuration as the relays of FIGS. 1 and 4. The transfer apparatus 21 includes the transfer relays PT and CT, the transfer indicating lamp 57, and the manual RESET-TRANSFER switch having contacts 53 and 54. The alarm apparatus 22 is connected to the transfer apparatus 21 by way of electrical connection 23 for automatic transfer.

Referring now to FIG. 3, for purpose of illustration, four relays R31, R32, R33 and R38 are shown selectively connected to the D.C. potential B by way of the rotary switches RS1 and RS2 and the switches S31, S32, S33 and S34. Assume that RS1, S31, R32, S33 and R38 are at one location and that the remainder of the elements are displaced somewhat to a relatively different location. Assume now that the wiper arms W1 and W2 are on terminals 31 and 31′, respectively. In this instance it is easily seen that if switch S31 is closed to signal a ground, relay R31 will be energized. The same is true for relays R32, R33 and R38 if the wipers are properly positioned and their respective switches are closed to signal a ground potential, or a battery potential as the case may be. Now assume that the rotary switches are stepped in synchronism in the directions indicated. Each time the wiper arms W1, W2 select a relay, that relay will be operated; provided of course the associated switch is closed. If the speed of rotation is increased, the relays will only be connected to the operating potential for a very short period at a time. As the speed of the rotary switches increases, a limit will be reached beyond which the relays are unable to be supplied with operating potential for a time that is sufficient to generate the required magnetomotive force to operate the relays. During each short time period that a relay is connected to the battery B, the battery B will in effect see a high impedance (the relay winding impedance).

From the above it is easily seen that it is therefore necessary to provide the relays with some means of providing a voltage for a time that is sufficient to operate the relays. This is effectively done as shown in FIGS. 1 and 4 and is described below.

Referring now to FIG. 1, the rotary switches of FIG. 3 have been replaced by the time division power supply 10. This power supply is realized by the combination of an oscillator 11, bistable devices 12, a logic sequence apparatus 13 and the drivers 14. The oscillator energizes the series of flip-flops FF–1 to FF–3. Each of these bistable circuits has, as is well known in the art, two output connections which supply, at the circuits particular counting position, either a binary one or a binary zero output to the logic sequence apparatus. These bistable circuits are connected to the logic apparatus 13 in a manner to provide a properly sequenced output at the required repetition frequency or cycle time. The outputs of the logic apparatus are connected to enable the drivers 14. Each of the driver circuits has two outputs, a switched battery (TB) and a switched ground (TG). These are noted with reference to their time slots as TB1 to TB8 and TG1 to TG8 in FIGS. 1 and 4. For illustration, assume that the switched grounds are of higher potential than the switched battery. As the output of the power supply 10 progresses in a recurring sequence, each of the relays R11 to R18 will be energized if the corresponding switches (S11 to S18) is closed. Assuming that the frequency of the time division power supply is in the order of from 1 to 10 kilocycles, it can be understood that as with the very fast operation of the rotary switches of FIG. 3, the relays present a very high impedance to any pulse that is transmitted from the power supply. Therefore, each relay is supplied with a shunting capacitor to act as a charge storage device. For example, if switch S12 is closed, a ground (TG2) is transmitted from the driver DR–2 during the second time slot. The ground is extended through switch S12, over the common connection EC through diode D12 to the parallel combination of the relay R12 and capacitor C12. Of course battery (TB2) is connected to the other side of this combination by way of connection CC12. The potential switched across the combination causes the capacitor C12 to begin to charge quickly through a relatively low resistance path (including distributed resistance 15). At the end of time slot 2 and for the remainder of the cycle the capacitance 12 will act as a source of potential and discharge through the relay R12; discharge through other circuitry being prevented by the blocking diode D12. The relay R12 offers a much higher resistance path for the capacitance discharge, thus effecting a relatively much longer discharge time constant than the charge time constant. A recurrence of time slot 2 will again begin to charge the capacitor, preferably, before the previous charge has been wholly dissipated. The recurrence of time slot 2 before complete discharge provides the relay with an effective voltage of a magnitude that is sufficient to provide the required operating magnetomotive force. This can be seen by referring to FIG. 6, wherein it is shown that the capacitor charges toward the supply voltage, that is the difference between TG and TB, during one time slot and discharges at a much slower rate during the remainder of the cycle. The sawtooth wave thus generated gives an effective voltage at the terminals of the relay that is sufficient to operate the relay.

Referring now to FIG. 4, the duplex signaling arrangement shown employs the time division power supply 20 having the switch outputs TB and TG. In this embodiment the grounds (TG1 to TG8) have been split and connected to the switching apparatus 40, 41 having switches S41 to S48. Relays R41 to R44 may be in one location and relays R45 to R48 may be in another location. It may be assumed that the switching apparatus 40 is located with the relays R41 to R44 and the switching apparatus 41 may be assumed to be located with relays R25 to R28. The above is not necessary to practice the invention, however it is felt that for purpose of illustration a better description may be given with this arrangement. The apparatus 40, 41 or the individual switches therein may be located elsewhere. However, with respect to duplex signaling they are located substantially as just stated so that switches at one end of the transmission highway EC control relays at the other end of the highway.

The arrangement operates substantially as that shown in FIG. 1. However, grounds TG1 to TG4 are transmitted from right to left over connection EC and grounds TG5 to TG8 are transmitted from left to right in FIG. 4. For example, if switch S45 of apparatus 40 is closed and switch S44 of apparatus 41 is closed, during time slot 4 a ground (TG4) will be transmitted to relay R44 from the power supply 20, through closed contact of S44 over connections EC′ and EC, through diode D44 to relay R44 and during the next time slot, time slot 5, ground (TG5) will be transmitted from power supply 20, through closed contacts of switch S45, over the connections EC″ and EC, through diode D45 to relay R45. Switched battery is of course supplied to these relays by way of connections CC44 and CC45 respectively. As previously discussed with respect to the capacitor charging and discharging, the capacitors C44, C44A will charge during the fourth time slot and the capacitors C45 will charge during the fifth time slot. Capacitors C44, C44A will then discharge through their respective relays, other discharge paths being blocked by diodes D44 and D44A, during time slots five through the next time slot three. A similar statement can be made for elements C45 and D45, except the discharge begins at time slot six and extends through the next time slot four. In FIG. 4 the charge path has been indicated as a solid line with arrowheads and the discharge path has been indicated by a broken line with arrowheads with respect to elements R41, C41, D41, R48A, C48A and D48A.

The invention, as previously stated, has been illustrated by indicating an eight time slot application. This is by no means meant to be a limited number of time divisions. It is also possible that one may want to have some potential other than ground be transmitted over the common highway. Ground was chosen for illustration only.

Furthermore, the distributed resistance of charging paths may be controlled by several methods. Fixed resistances could be interposed in the charging path, to all relay-capacitor combinations, or individual to the capacitances. In the latter case it has been found advantageous in certain instances to employ a two winding relay and connect one of the windings of the relay serially in the capacitor charge path, the capacitor however still shunting the other winding of the relay.

Referring now to FIGS. 2 and 5, FIG. 5 shows the alarm and transfer apparatus 22 and 21, in much greater detail than is shown in FIG. 2. In FIG. 2 the outputs of the bistable circuits have been referenced 26A0 and 26A1 to 28A0 and 28A1 for group A and 26B0 and 28B1 to 28B0 and 28B1 for group B. These inputs to the transfer apparatus 21 can be seen in the upper right hand corner of FIG. 5. The input connections from the drivers 14 of FIG. 2 to the alarm apparatus 22 have been referenced AL1 to AL4 and can be seen in the upper left hand corner of FIG. 5. As can be seen in FIG. 2, connection AL1 has the switched battery potentials of TB1, TB3, TB5 and TB7, applied thereto; connection AL2 has the switched potentials TG2, TG4, TG6, and TG8 applied thereto; connection AL3 has the switched potentials TG1, TG3, TG5, and TG7 applied thereto; and connection AL4 has the switched potentials TB2, TB4, TB6, and TB8 applied thereto. In the center of FIG. 5 electrical connection 23 can be seen linking the alarm apparatus 22 to the transfer apparatus 21. Other connections such as connections 24A and 24B from the voltage regulating apparatus 27 for regulating voltage transfer and the output connection 25 from the transfer apparatus 21 to the sequence logic apparatus 13 may also be seen in FIG. 5. In FIG. 5 signal receiving apparatus, the relay capacitor combinations ARA and AC1, ARB and AC2, ARC and AC3, monitor the outputs of the time division power supply 20 and automatically control the transfer from the group A equipment to the group B equipment in the event of any fault or failure. Further included in FIG. 5 are relays ARD, PT, and CT, and the alarm and transfer indicating lamps 51 and 57 respectively.

Referring first to relays ARA and ARB and their associated capacitors and diodes, and assuming that the output circuitry of the driver circuits 14 comprise a series voltage divider including transistors and resistors, it can be seen that these two relays ARA, ARB monitor the power supply for two outputs in one time slot, crossfiring of transistors, shorted transistors, grounded TG leads and common equipment failure. Any of these just-named faults will cause these relays to operate and close ground to electrical connection 23 at contacts ARA1 and ARB1. This ground is extended by way of electrical connection 23 to the contact 54 of the reset-transfer switch and to the slow to operate relay PT. Relay PT operates and on the one hand transfers the regulated voltage on connections 24A and 24B. On the other hand it closes its connectons PT7 and PT8 connecting ground to the transfer lamp 57 causing it to light, and to the transfer relay CT, energizing relay CT and causing the transfer of the bistable circuit outputs. The ground that was supplied to relay CT and lamp 57 is also connected back to the RESET-TRANSFER switch at electrical connection 23 to hold relay PT operated. Relays ARA and ARB also close contacts ARA2 and ARB2 to supply ground to lamp 51 indicating an alarm condition.

Referring now to relay ARC and its associated components, it can be seen that this relay monitors for time slot output failures, open transistor circuitry in the output section of the drivers 14, grounded TB leads and common equipment failure. Relay ARC has the normally operated contacts ARC1, ARC2 and ARC3, which upon any of the above faults, will release. Upon release contact ARC2 closes ground to contact ARD2 still open of relay ARD. Release of contact ARC3 closes ground on the slow to operate relay ARD. When relay ARD operates ground is placed on lamp 51 indicating a fault by way of contact ARD3. Also contact ARD2 carrying ground via ARC2 places ground on the electrical connection 23 and automatic transfer is accomplished as previously discussed. Closure of contact ARD1 places the switched battery potentials again on relay ARC, which upon discovery that proper operation has been resumed as a result of transfer will again be placed in the normally operated position closing ARC1, opening ARC2, and opening ARC3; a total reset of the alarm equipment. In this particular circuit embodiment, the equipment must be reset from group B to group A by manual action of the reset contact 54 removing the holding ground from relay PT, de-energizing relay PT, opening contacts PT7 and PT8 and de-energizing relay CT and extinguishing lamp 57.

It should again be noted that the electrical connection or signal path referenced EC may very well be the fourth wire in a step-by-step switch train. Also the relays and switches may also be part of that same switch train. It is also possible that some of the individual switches may be contacts of some of the relays. Applications of the invention are numerous and many changes and modifications not specifically mentioned herein may be made on the invention by one skilled in the art without departing from the spirit and scope of the invention and should be included in the appended claims.

What is claimed is:

1. A duplex signaling arrangement comprising:

an electrical conductor;

a first plurality of relay-capacitance combinations connected to one end of said electrical conductor;

a second plurality of relay-capacitance combinations connected to the other end of said electrical conductor, each said capacitance in each said plurality connected in shunt relation with its corresponding relay; and a time division power supply having a plurality of output terminal pairs and operating to provide switched signal potentials to each said terminal pair in a cyclic manner during discrete recurring time slots, one terminal of each said pair connected to separate ones of said relay-capacitance combinations;

first switch means connected between a first portion of said other terminals and said other end of said electrical conductor, said first switch means being operable to extend in a first direction over said electrical conductor to said first plurality of relay-capacitance combinations, and second switch means connected between another portion of said other terminals and said one end of said electrical conductor, said second switch means being operable to extend signals in a second direction over said electrical conductor to said second plurality of relay-capacitance combinations.

2. The duplex signaling arrangement according to claim 1 and further comprising a plurality of diode means, each of said diode means serially connected between separate ones of said relay-capacitance combinations the corresponding end of said electrical conductor for isolating the corresponding relay-capacitance combinations to insure a local discharge of the corresponding capacitance through the corresponding relay.

3. A signaling arrangement comprising: a time division power supply including a plurality of output terminal pairs and operating to provide switched signal potentials to each said pair in a cyclic manner during discrete recurring time slots; a plurality of relay-capacitance combinations, each said capacitance being connected in shunt relation to its corresponding relay; a plurality of switch means; and a signaling conductor common to said plurality of relay-capacitance combinations and to said plurality of switch means, each said relay-capacitance combination being connected between one end of said common signaling conductor and one terminal of the respective terminal pair, and each said switch means being connected between the other end of said common signaling conductor and the other terminal of the respective terminal pair, each said capacitance upon operation of the respective switch means being charged by the signal potentials on the respective terminal pair over said common signaling conductor during the associated time slot and being discharged through its corresponding relay during the other time slots to provide an effective voltage that is sufficient to operate said relay.

4. The signaling arrangement according to claim 3, and further comprising a plurality of diode means each interposed between separate ones of said relay-capacitance combinations and said one end of said signaling conductor for isolating said combinations one from the other and insuring a local discharge of each said capacitance.

5. A time division power supply comprising: first and second oscillators; first and second counters respectively connected to said first and second oscillators and operated thereby to count oscillations; a plurality of driver means, each said driver means having at least two output terminals and operable to provide one of said terminals with a first switched potential and the other of said terminals with a second switched potential; logic means including a plurality of inputs connected to said two counters and a plurality of outputs connected to said plurality of driver means, said logic means operated to encode the count of a connected one of said counters for sequentially operating said plurality of driver means; alarm apparatus connected to the output terminals of said plurality of driver means for monitoring the operation of said power supply; and apparatus interposed between said two counting means and said logic means, said apparatus being operable to transfer the inputs of said logic means between said first and second counters so that said power supply may be operative with either of said first oscillator and first counter or said second oscillator and said second counter.

6. A time division power supply, as claimed in claim 5 and further comprising electrical connection means interposed between said alarm apparatus and said transfer apparatus, said transfer apparatus operated in response to said alarm apparatus to automatically transfer the inputs of said logic means between said first counter and said second counter and wherein said transfer apparatus includes means for manually transferring the inputs of said logic apparatus between said two counters.

7. A time division power supply, as claimed in claim 6, wherein said alarm apparatus comprises first and second signal receiving apparatus each connected to output terminals of said driver means that do not make up terminal pairs, said two signal receiving apparatus monitoring said power supply for failures, said failures including plural outputs in a single time slot and shorted terminal pairs, said transfer apparatus operated in response to the conjunct operation of said two signal receiving apparatus by way of said electrical connection means to automatically transfer the inputs of said logic means.

8. A time division power supply, as claimed in claim 7, wherein said alarm apparatus further comprises a third signal receiving apparatus connected to said one output terminal of said driver means and to said other output terminal of said driver means for monitoring said power supply for failures, said failures including time slot output failures, said transfer apparatus operated in response to the operation of said third signal receiving apparatus by way of said electrical connection means to automatically transfer the inputs of said logic means.

9. A time division power supply, as claimed in claim 8, wherein said first, second and third signal receiving apparatus each includes relay means and capacitance means connected in shunt relation to said relay means, the charging and discharging of each said capacitance means providing an effective voltage that is sufficient to operate its corresponding relay means.

10. A time division power supply, as claimed in claim 9, and further comprising diode means associated with said three signal receiving apparatus to isolate each said signal apparatus one from the other and insure a local discharge of each said capacitance means through its corresponding relay means.

References Cited

UNITED STATES PATENTS

| | | | |
|---|---|---|---|
| 2,506,429 | 5/1950 | Melick | 179—15 |
| 3,018,449 | 1/1962 | Farrelly | 340—157 X |
| 3,205,312 | 9/1965 | Brightman et al. | 179—15 |
| 3,274,553 | 9/1966 | Yuichiro Oya | 340—147 |

FOREIGN PATENTS

| | | |
|---|---|---|
| 1,350,949 | 12/1963 | France. |

NEIL C. READ, *Primary Examiner.*

D. YUSKO, *Assistant Examiner.*